Figure 1:
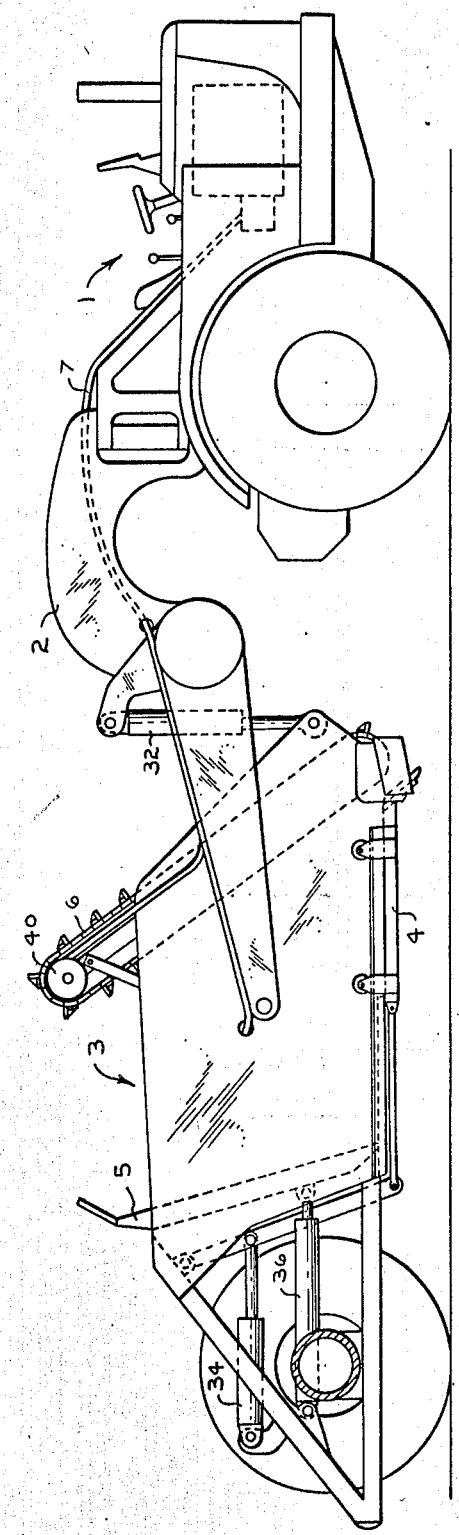

Oct. 12, 1965　　　　A. J. HEIN　　　　3,210,869
HYDRAULIC CIRCUIT HAVING TWO PUMPS FOR SELF-LOADING SCRAPERS
Filed April 19, 1963　　　　　　　　　　2 Sheets-Sheet 1

INVENTOR.
ALLYN J. HEIN
BY
ATTORNEYS

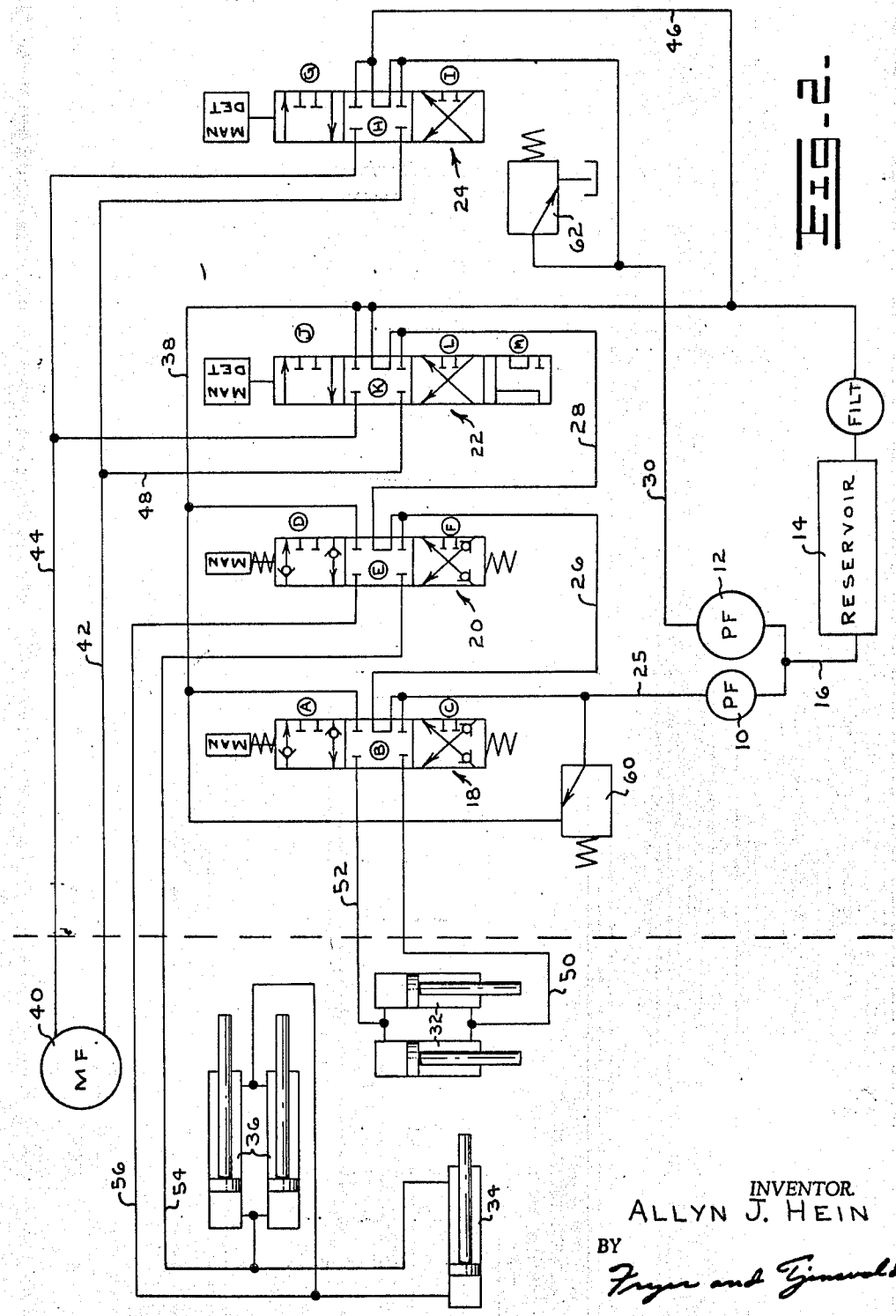

United States Patent Office 3,210,869
Patented Oct. 12, 1965

3,210,869
HYDRAULIC CIRCUIT HAVING TWO PUMPS
FOR SELF-LOADING SCRAPERS
Allyn J. Hein, Joliet, Ill., assignor to Caterpillar Tractor
Co., Peoria, Ill., a corporation of California
Filed Apr. 19, 1963, Ser. No. 274,209
5 Claims. (Cl. 37—8)

The present invention relates to hydraulic circuits and particularly to a hydraulic circuit for selective actuation of the bowl lift jacks, ejector jacks, movable floor actuating jacks and conveyor of a self-loading scraper.

In conventional self-loading scrapers a vertically adjustable bowl is provided with a slidable floor, an ejector plate at the rear and a conveyor at the front of the bowl. The jacks for lifting the bowl and for actuating the slidable floor and ejector plate are normally controlled through a hydraulic take off from the propelling tractor. The conveyor is normally operated by mechanical or electrical means. An electric drive, however, has certain disadvantages in this environment and a mechanical drive crossing the articulate connection between the tractor and scraper results in a complex and expensive mechanism.

One object of the present invention is to provide a suitable hydraulic drive for the conveyor which is compatible wth the existing hydraulic circuit for actuation of the other scraper components.

Another object of the invention resides in the provision of a float position for the conveyor whereby it may selectively be manually moved in either direction as for example to permit inspection.

Another object is to provide a power source for the conveyor separate from the power driving the other components, thereby assuring adequate power to drive the conveyor. In this connection the present invention contemplates that the power driving the lift jacks for the bowl and actuating the slidable floor and ejector plate may selectively be connected with the conveyor to give further driving power to the conveyor when necessary.

The foregoing and other objects will be appreciated upon reading the following written description in connection with the accompanying drawings wherein:

FIG. 1 schematically illustrates in side elevation a tractor propelled self-loading scraper; and FIG. 2 is a diagram of a hydraulic circuit for actuation of the components of the self-loading scraper in accordance with the present invention.

FIG. 1 illustrates a tractor 1 articulated to the gooseneck 2 of a self-loading scraper 3. The scraper bowl includes a slidable floor 4, an ejector plate 5 at its rear and a conveyor 6 at its front. A hydraulic circuit from the tractor is indicated at 7.

The hydraulic circuit for actuation of the components of the scraper shown in FIG. 2 includes a pair of pumps 10 and 12 connected to tank or reservoir 14 through line 16. The pumps supply fluid under pressure to first, second, third and fourth manually operated valves 18, 20, 24 and 22 through lines 25, 26, 30 and 28 respectively. Valve 18 may be moved to either of two positions to selectively control the movement of a pair of bowl lift jacks 32 to raise the bowl to a carry position. Valve 20 is also movable to either of two positions to direct fluid to either end of jack 34 to advance or retract slidable floor 4 of the scraper and to a pair of jacks 36 for advancing or retracting the scraper ejector plate 5. Valve 22 may be moved to any of three positions to provide a relatively slow speed forward or reverse drive or a free wheeling or float condition of the elevator. First, second and fourth valves 18, 20 and 22 are connected in a modified series arrangement by lines 26, 28 and return line 38 such that movement of valves 18 or 20 in either direction from the neutral position is effective to block communication of fluid from pump 10 to fourth valve 22.

Pump 10 has a relatively small capacity sufficient to actuate jacks 32, 34 and 36 at the desired speed. Pump 12 has a relatively large capacity for driving conveyor 6 by rotation of a hydraulic motor 40. Valves 18 and 20 have been illustrated as of the spring centered type. Valve 22 is a four detent type and valve 24 is a three detent type, both without centering springs.

FIG. 2 diagrammatically shows the following positions for the valves: For first valve 18 controlling bowl lift jacks 32, A indicates the raise or lift position, B the hold position and C the down or lower position. For second valve 20, D is the floor retract and ejector plate advance position, E the hold position and F the floor close and ejector plate return position. For third valve 24, G is the forward position causing conveyor 6 to rotate in a clockwise position as shown in FIG. 1, H is the stop position and I is the reverse position. For fourth valve 22 providing auxiliary power to drive the conveyor, J represents the slow speed forward position, K the stop position, L the reverse or counterclockwise rotation position and M is a float position interconnecting circuits 42 and 44 whereby conveyor 6 may be manually moved in either direction.

To commence the loading operation, valve 18 is raised to the C or lowering position to engage the cutting edge of the scraper with the ground. Third valve 24 is lowered to the G position to direct fluid discharge of large pump 12 through line 42 to motor 40 to drive conveyor 6 in a forward or clockwise direction to assist by urging material being loaded rearwardly in the bowl. Fluid displaced in the motor is directed through line 44 and return line 46 to reservoir 14. Pump 12 is driven by the tractor engine and its fluid output is directly proportionate to engine r.p.m. As heavy loads are encountered during the loading operation, the speed of the engine may fall too low to provide a volume of fluid sufficient to drive the elevator at the optimum speed. As the conveyor speed slows down, loading resistance increases and the speed of the engine is further reduced, resulting in inefficient loading of the scraper. Additional power may be supplied to motor 40 by shifting valve 22 downward to the J position to direct the output of pump 10 through line 48 and line 42 to maintain an acceptable speed of rotation of conveyor 6 in combination with the output of pump 12.

When the bowl is filled to capacity, valve 18 is moved downward to position A to direct fluid from line 25 through line 50 to the rod end of jacks 32, raising the bowl to the carry postion. Fluid displaced from the head ends of jacks 32 is returned to tank 14 through line 52, valve 18 and return line 38. The supply of fluid to motor 40 may be discontinued by moving third valve 24 to the stop position H, as shown.

If material in the scraper bowl is loose or granular, it may be desirable to maintain a relatively slow forward or clockwise drive of the elevator to retain material in the bowl during transport. This may be effected by moving valve 22 downward to the J position to direct the volume of small pump 10 to motor 40, to provide relatively slow rotation of the conveyor.

To dump the load from the bowl, valve 20 is moved downward to the D position to direct fluid through line 54 to the rod end of jack 34 and the head ends of jacks 36. Since resistance to movement of bowl floor 4 is less than that of ejector plate 5, the floor will be retracted before the ejector plate moves. As soon as jack 34 reaches the end of its stroke, pressure in the circuit will rise sufficiently to move ejector 5 by extension of jacks 36 and the material is ejected through the opening defined in the bottom of the bowl by the retracted bowl floor. Fluid displaced from the opposite ends of jacks 34 and 36 is returned to tank 14 through line 56, valve 20 and return line 38. After the load has been dumped, second valve 20 is moved upward to the F position to direct fluid to the head end of jack 34 and the rod ends of jacks 36 and to communicate the opposite ends of these jacks with tank 14. This extends jack 34 closing bowl floor 4 and retracts jacks 36 to return the ejector to its normal position at the rear of the scraper bowl.

When sticky, cohesive materials are being ejected from the bowl, it is sometimes desirable to rotate conveyor 6 in a reverse or counterclockwise direction to aid in movement of material. This is done by moving valve 24 upward to the I position to direct the output of pump 12 through line 44 to the opposite side of motor 40, thereby driving conveyor 6 in a counterclockwise direction. This reverse drive to the conveyor may be supplemented by shifting valve 22 upward to the L position to supplement the output of pump 12 with that of pump 10.

It is sometimes desirable that the elevator be freely rotatable, for example, during inspection or service of the conveyor mechanism when it may be desired to rotate the conveyor by hand. This is done by moving fourth valve 22 upward to the M position to interconnect lines 42, 44, 28 and 38, thereby permitting motor 40 in the elevator to be freely rotatable.

Relief valves 60 and 62 in lines 25 and 30 limit maximum pressure of the circuits.

What is claimed is:

1. In a self-loading scraper including a vertically adjustable scraper bowl having a movable floor, an ejector plate in the rear of said bowl and a conveyor in the front of said bowl comprising in combination; first, second and third jacks and a motor for actuating respectively said bowl, floor and ejector plate, and conveyor; a hydraulic system for actuating said jacks and motor including a first valve connected to said first jack and selectively operable to supply fluid to either end of said jack, a second valve connected to said second and third jacks and selectively operable to supply fluid to either end of said second and third jacks, a third valve connected to said motor and selectively operable to supply fluid to drive said motor in either direction, and means for supplying fluid under pressure to said valves including a pair of pumps of different capacities, the lower capacity pump being connected to said first and second valves and the higher capacity pump being connected to said third valve.

2. The combination of claim 1 including a fourth valve connected to said first pump and said motor and selectively operable to supply fluid to drive said motor in either direction to supplement said second pump.

3. In a self-loading scraper including a vertically adjustable scraper bowl having a movable floor, an ejector plate in the rear of the bowl and an hydraulically driven conveyor in the front of the bowl, the combination comprising;

a first hydraulic circuit including hydraulically actuated jacks for actuating each of the bowl, movable floor and ejector plate;
a first pump hydraulically associated with said first circuit to provide pressure fluid therefor;
a second hydraulic circuit including the conveyor drive means;
a second pump hydraulically associated with said second circuit to provide pressure fluid therefor; and
valve means hydraulically disposed between said first pump and said second circuit, said valve means selectively operable to communicate said first circuit with said second pump whereby the pressure fluid from both of said pumps is directed to the conveyor drive means.

4. In a self-loading scraper including a vertically adjustable scraper bowl having a movable floor, an ejector plate in the rear of the bowl and a conveyor in the front of the bowl, the combination comprising;

a first pump;
hydraulically actuated bowl jacks for vertically positioning the bowl;
first valve means hydraulically disposed between said first pump and said bowl jacks, said valve means selectively operable to communicate said first pump with said bowl jacks, said valve means further selectively operable to bypass fluid directed thereto from said first pump;
hydraulically actuated floor and ejector jacks;
second valve means hydraulically disposed between said first valve means and said floor and ejector jacks, said second valve means selectively operable to direct bypass fluid from said first valve means to said floor and ejector jacks, said second valve means further selectively operable to bypass fluid directed thereto;
a second pump;
a hydraulically driven conveyor motor;
third valve means hydraulically disposed between said second pump and said conveyor motor, said third valve means selectively operable to communicate said second pump with said conveyor motor; and
fourth valve means hydraulically disposed between said second valve means and said conveyor motor, said fourth valve means selectively operable to direct fluid bypassed by said second valve means to said conveyor motor.

5. The self-loading scraper of claim 4 wherein said fourth valve means is selectively operable to communicate the input of said conveyor motor with the output of said conveyor motor whereby said conveyor is free to float.

References Cited by the Examiner
UNITED STATES PATENTS

| | | | |
|---|---|---|---|
| 519,469 | 5/94 | Emery | 60—53 |
| 2,103,530 | 12/37 | Henry | 60—52 X |
| 2,301,098 | 11/42 | Twyman | 60—97 |
| 2,647,853 | 4/54 | Born | 98—203 X |
| 2,844,892 | 7/58 | Carston. | |
| 3,066,429 | 12/62 | Hancock | 37—129 |
| 3,143,814 | 8/64 | Brinkmeyer | 37—8 |

BENJAMIN HERSH, *Primary Examiner.*

UNITED STATES PATENT OFFICE
CERTIFICATE OF CORRECTION

Patent No. 3,210,869                           October 12, 1965

Allyn J. Hein

It is hereby certified that error appears in the above numbered patent requiring correction and that the said Letters Patent should read as corrected below.

Column 4, line 11, for "said first circuit" read -- said first pump --; line 12, for "with said second pump" read -- with said second circuit --.

Signed and sealed this 18th day of October 1966.

(SEAL)
Attest:

ERNEST W. SWIDER                                  EDWARD J. BRENNER
Attesting Officer                                       Commissioner of Patents